United States Patent [19]

Franza

[11] Patent Number: 4,831,940
[45] Date of Patent: May 23, 1989

[54] METAL SEPARATION SYSTEM FOR INCINERATORS

[76] Inventor: Frank Franza, Two Garity Pl., East Farmingdale, N.Y. 11735

[21] Appl. No.: 185,544

[22] Filed: Apr. 25, 1988

[51] Int. Cl.[4] .......................... F23G 5/00; F23G 5/12
[52] U.S. Cl. ............................... 110/259; 110/165 R; 209/218; 209/219
[58] Field of Search .................... 241/24, DIG. 38; 110/259, 165 R; 209/38, 218, 299

[56] References Cited

U.S. PATENT DOCUMENTS

| | | | |
|---|---|---|---|
| 2,844,251 | 7/1958 | Le Roy | 209/218 X R |
| 3,973,736 | 8/1976 | Nilsson | 241/DIG. 38 |
| 4,031,004 | 6/1977 | Sommer, Jr. et al. | 241/DIG. 38 |
| 4,669,397 | 6/1987 | Galgana et al. | 110/259 |

Primary Examiner—Edward G. Favors
Attorney, Agent, or Firm—Stanley Ira Laughlin

[57] ABSTRACT

The invention relates to a system for separating metals and ashes from the residue remaining after incineration by positioning a magnetic drum between six (6) and twelve (12) inches from the conveyor transporting said residue to result in the maximum amount of reclaimed metal.

2 Claims, 1 Drawing Sheet

METAL SEPARATION SYSTEM FOR INCINERATORS

BACKGROUND OF THE INVENTION

The invention relates to systems for separating metals from other materials and more specifically for a system for separating metals from the residue obtained from incinerators such as may be classified in Class 209, subclasses 8+ and 12+, Class 122 subclass 2, and Class 110, subclasses 7+ and 18+.

SUMMARY OF THE INVENTION

The invention relates to a mechanical/electrical system that comprises the positioning of a magnetic drum between 6 and 12 inches from the end of the conveyor carrying the residue from the incinerator. Positioning the magnets in proximity from the conveyor enables the magnets to pick up higher percentages of metals from the residue without interfering with the normal flow of ashes and unburned residue.

The object of the invention is to provide simple, economical and safe means for increasing the percentage of metal removed from incinerator residue, and thereby resulting in a more efficient incineration process.

DETAILED DESCRIPTION

The residue from an incinerator essentially consists of metals, ashes and unburned waste, which can be disposed of either by recycling or reburning. Conventional magnetic drums distantly placed 18 inches or further away from the conveyors allow large percentages of metal to remain unseparated from the ashes and the unburned waste resulting in additional cleaning steps for reclaiming clean metal.

Figure 1:
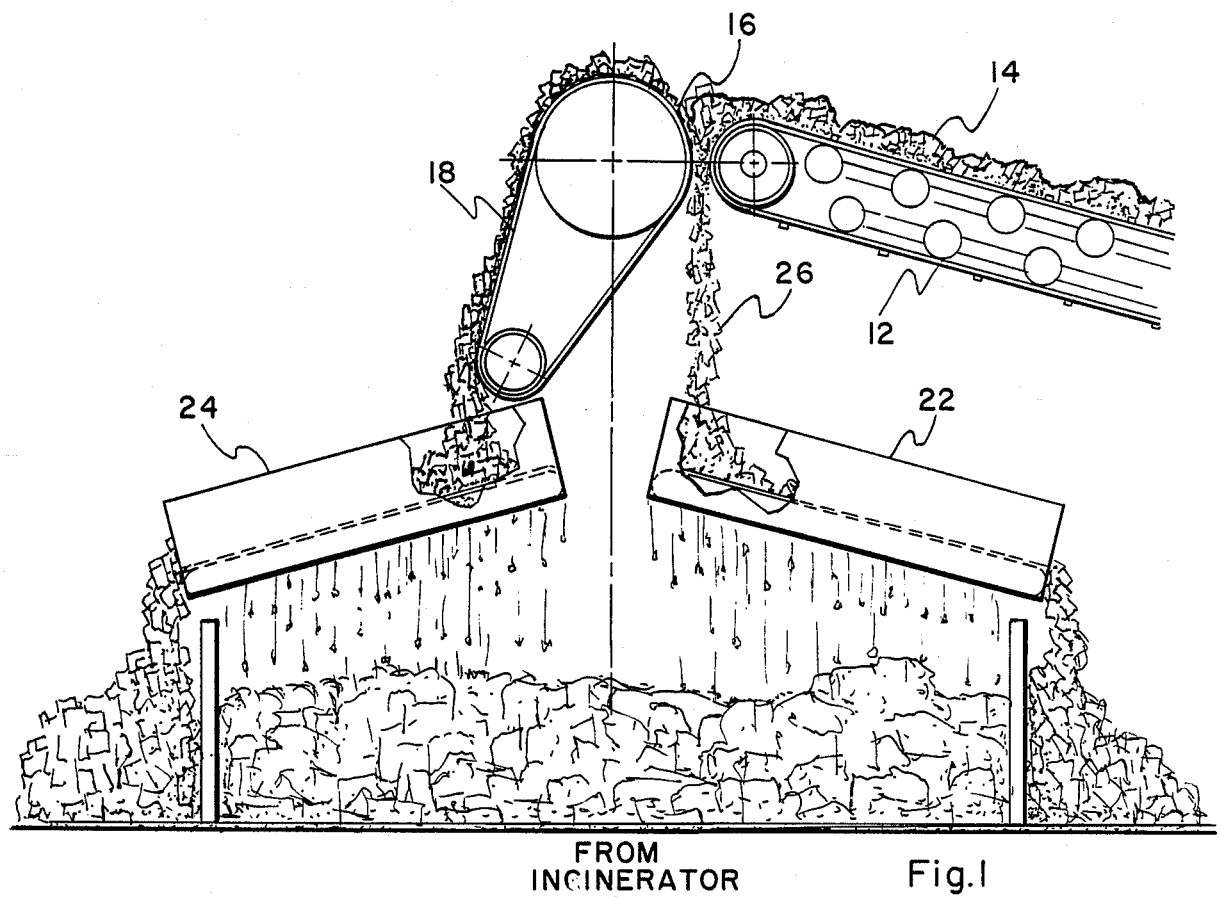
FIG. 1 shows applicant's invention for improving the reclamation of metals from incinerator residue.

FIG. 1 shows the mechanical/electrical equipment for separating metals, ashes and unburned waste implementing applicant's invention. A residue conveyor 12 carries the residue 14, essentially consisting of metals, ashes and unburned waste, from the incinerator (not shown). Another conveyor system 18 comprising a magnetic drum 16 capable of being positioned between 6 and 12 inches from one end of conveyor 12, enabling the metals in the incinerator residue 14 to be attracted to conveyor 18 while remaining components of the incinerator residue 14; namely: unburned waste and ashes that are not adhering to the metals are sent to ash sizing and waste removal screen 22. The positioning of the magnetic drum 16 can be varied between six and twelve inches so as increase the percentage of reclamation of metal and not interfere with the flow of the incinerator residue 14. The metal and ashes adhering to the metal attracted to conveyoe 18 are sent to metal cleaning vibratory screen 24, which cleans the ashes from the metal and allows the ashes to drop through the screen while transporting the cleaned metal to a bay at the end of the screen. The ashes and unburned waste 26 on ash sizing and waste removal screen 22 will be separated by allowing the ashes to drop through the screen while the unburned waste will be transported to a bay at the ends of the ash sizing and waste removal screen 22.

Figure 2:
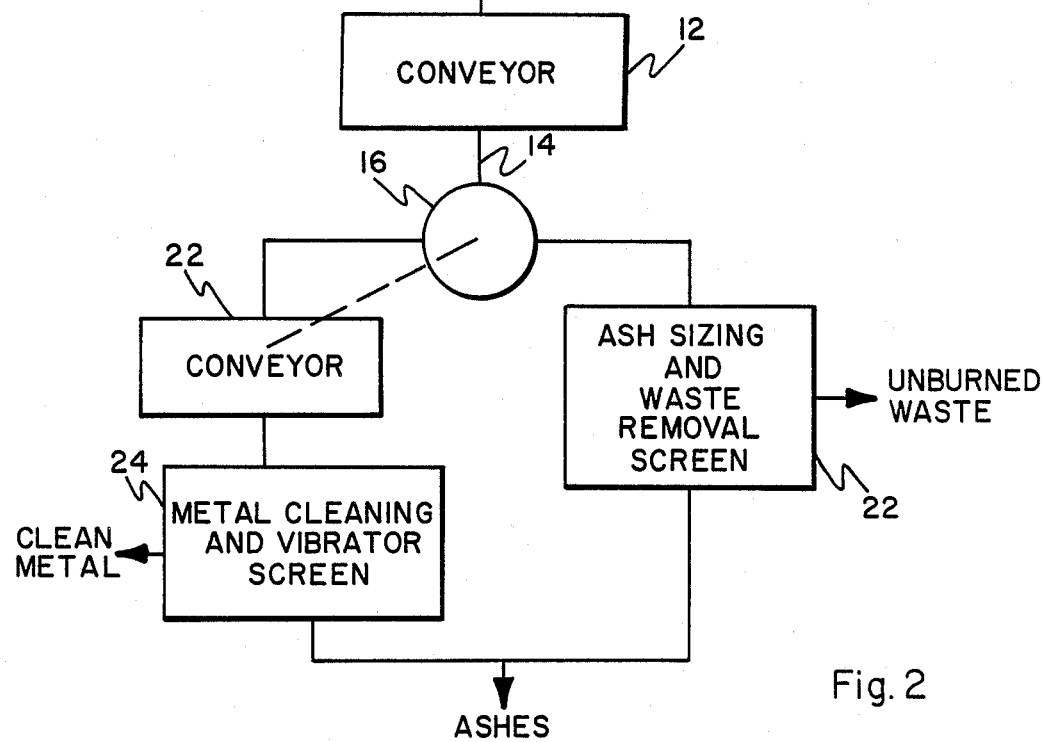
FIG. 2 shows a flow diagram of applicant's invention as shown in FIG. 1.

FIG. 2 is a flow diagram clearly pointing out and showing applicant's invention. Incinerator residue 14 on conveyor 12 is separated into metal and ashes covering the metal as well as ashes and unburned waste 26. The metal and ashes covering the metal are directed in the path of magnetic drum 16 incorporated into conveyor 18; the percentage of metal being increased to a maximum by adjusting the position of the magnetic drum from conveyor 12 between 6 and 12 inches. The metal and ashes covering the metal are then directed to vibrating screen 24; further separating the ashes from the metal and producing clean metal. The ashes and unburned waste 26 are directed on to ash sizing and waste removal screen 22, where further separation of the ashes from the unburned waste occurs.

Although only one embodiment of applicant's invention has been disclosed, it is expected that the scope and breadth of the invention will only be limited by the scope and breadth of the annexed claims:

I claim:

1. A system for separating metals from incinerator residue waste comprising four conveyor systems the first providing means for transporting the incinerator residue waste, the second having magnetic means abutting the end of the first conveyor system for separating metals from the incinerator waste at the end of the first conveyor system, said magnetic means having adjustable spacings between six (6) and twelve (12) inches from said first conveyor system for increasing the amount of metal reclaimed from said incinerator residue waste to a maximum, the third having means for separating ashes from metals in addition to means for transporting metals and the fourth having means for separating ashes and unburned waste.

2. A system for separating metals from incinerator residue comprising first conveyor means for transporting said incinerator residue, second conveyor means abutting and variably positioned in proximity to the discharge end of said first conveyor means, said second conveyor means having magnetic means incorporated therein for separating metals and ashes adhering to said metals from the ashes and unburned waste of the incinerator residue transported on said first conveyor means, said magnetic means being positioned in proximity to the discharge end of said first conveyor means and variably spaced between six (6) and twelve (12) inches from said first conveyor means, third conveyor means having means for receiving and separating said metals and the ashes adhering to the metal separated by said magnetic means, and fourth conveyor means for receiving and separating the ashes and unburned waste of the incinerator residue from the discharge end of said first conveyor means.

* * * * *